United States Patent [19]

Haikawa

[11] Patent Number: 4,907,104
[45] Date of Patent: Mar. 6, 1990

[54] ROTATABLE HEAD TYPE DIGITAL MAGNETIC RECORDING AND REPRODUCING DEVICE HAVING A PLURALITY OF OPERATING MODES

[75] Inventor: Yukihiko Haikawa, Higashihiroshima, Japan

[73] Assignee: Sharp Kabushiki Kaisha, Osaka, Japan

[21] Appl. No.: 278,773

[22] Filed: Dec. 2, 1988

[30] Foreign Application Priority Data

Dec. 2, 1987 [JP] Japan .................................. 62-306226

[51] Int. Cl.$^4$ ............................................... G11B 15/14
[52] U.S. Cl. ......................................... 360/64; 360/65
[58] Field of Search ..................... 360/84, 94, 95, 64, 360/65

[56] References Cited

U.S. PATENT DOCUMENTS

| | | | |
|---|---|---|---|
| 4,197,562 | 4/1980 | Kikuya et al. | 360/64 |
| 4,396,954 | 8/1983 | Sonoda et al. | 360/64 |
| 4,426,666 | 1/1984 | Kobayashi et al. | 360/64 |
| 4,771,345 | 8/1988 | Watanabe | 360/64 |
| 4,796,103 | 1/1989 | Tokuyama | 360/64 |

OTHER PUBLICATIONS

*Video Tape Recorders*, 2d Ed. by Harry Kybett, Howard W. Sams & Co., Inc., Indianapolis, Indiana, 1978, pp. 22–23.

*Primary Examiner*—Vincent P. Canney
*Attorney, Agent, or Firm*—Birch, Stewart, Kolasch & Birch

[57] ABSTRACT

A digital magnetic recording and reproducing device of rotatable magnetic head type includes a rotary drum, first and second recording and reproducing heads situated at opposite positions on the circumference of the rotary drum with opposite azimuth angles, and a third recording and reproducing head adjacent to the second recording and reproducing head, with an azimuth angle opposite to the azimuth angle of the adjacent second head. In the normal reproduction mode, the first and second heads are used, but in the long time reproduction mode, the second and third heads are used. However, the rotational speed of the rotary drum is the same in each mode, allowing for the use of one equalizer for reproducing the signal for both the normal reproduction mode and long time reproduction mode.

3 Claims, 4 Drawing Sheets

ROTATABLE HEAD TYPE DIGITAL MAGNETIC RECORDING AND REPRODUCING DEVICE HAVING A PLURALITY OF OPERATING MODES

BACKGROUND OF THE INVENTION

1. Field of the Invention

The present invention relates to a rotatable head type digital recording and reproducing device having a plurality of operation modes, and more particularly, to a magnetic recording and reproducing device for recording and reproducing data signals with different tape feeding speeds respectively.

2. Description of the Prior Art

FIG. 1 shows a block diagram of a conventional magnetic recording and reproducing device. Analog signals to be recorded which are entered from an input terminal 1 are applied to a record signal processing unit 2, wherein the analog signals are converted into digital signals. Added to the converted digital record signals are one or more synchronizing bits and parity bits, thereby converting the digital record signals into an array of digital signals in a predetermined recording format. The converted digital signal array as mentioned above is modulated into high frequency signals having a frequency appropriate for recording on a magnetic tape 4, such as a frequency $f_0$ for a logic "0" bit and a frequency $f_1$ for a logic "1" bit. Subsequently, the modulated high frequency signals entered amplifiers 5a and 5b.

The modulated signals entering the amplifiers 5a and 5b are current amplified and outputted to coils A1 and B1, respectively, which are provided in a fixed drum SD. Coils A2 and B2 which are provided in a rotary drum RD are magnetically coupled to the coils A1 and B1 respectively so as to constitute rotary transformers. The output signals of the amplifiers 5a and 5b which are frequency modulated are transmitted to the coils A2 and B2 through the coils A1 and B1 by induction and are recorded on the magnetic tape 4 through magnetic heads A and B respectively.

The magnetic heads A and B are disposed on the rotary drum RD so as to oppose each other at an angle of 180° as shown in FIG. 2. When the magnetic head A or B traces a track on the magnetic tape 4 to detect a signal and if one of the magnetic heads A and B comes in contact with an adjacent track, cross talk occurs with the adjacent track, resulting in noise occurring in the reproduced signals. Therefore, the magnetic heads A and B are attached to the drum RD with different azimuth angles to reduce the cross talk. For example, the magnetic head A is attached to the rotary drum RD having with an azimuth angle of plus 20° and the magnetic head B is attached to the rotary drum RD having an opposite azimuth angle of minus 20°. Above "azimuth angle" means an inclination angle between a line perpendicular to the track and a head gap. The azimuth angle is defined to reduce the cross talk between two adjacent tracks.

As shown in FIG. 2, the magnetic tape 4 is wound along the circumference surface of the rotary drum RD for about 90° and the feeding direction of the magnetic tape 4 is coincident with the rotating direction of the rotary drum RD.

FIG. 3 shows a track pattern recorded on the magnetic tape 4, wherein tracks $a_1, a_2, ..., a_5, ...$ (represented as "a" hereinafter) are the tracks recorded by the magnetic head A and tracks $b_1, b_2, ..., b_4, ...$ (represented as "b" hereinafter) are the tracks recorded by the magnetic head B. The signals recorded in the track patterns a and b as shown in FIG. 3 are reproduced through the magnetic heads A and B provided on the rotary drum RD. When the head gap of the magnetic head A traces along the track $a_1$ e.g. shown in FIG. 3, the magnetic lines of force of the head gap of the magnetic head A are varied in response to the record signals. The variation in the magnetic lines of force thereof is transmitted to the coil A1 provided in the fixed drum SD, wherein the coil A1 is magnetically coupled with the coil A2 provided in the rotary drum RD, thereby varying the induced voltage in the coil A1. Also, the recorded signals on the track $b_1$ are similarly transmitted to the coil B1 as the induced voltage variation.

The reproduced signals output from the coils A1 and B1 are respectively applied to amplifiers 6a and 6b through a signal selecting switch 7. The reproduced signals are not continuous signals but intermittent signals generated from the coils A1 and B1 every time during which the magnetic heads A or B trace any one of the tracks on the magnetic tape 4 as shown in FIG. 2. Accordingly, one of the amplifier 6a or 6b is selected by switching the signal selecting switch 7 in response to a switching signal sent from a reproduction signal processing unit 10 so as to transmit the reproduced signal from the magnetic head A or B which is tracing the track and reproducing the signal. Both of the reproduced signals sent from the coils A1 and B1 are applied to equalizers, 8a and 8b. The equalizer 8a is selected when the rotational speed of the rotary drum RD is e.g. 2000 r.p.m., and the equalizer 8b is selected when the rotational speed of the rotary drum RD is e.g. 1000 r.p.m.. An equalizer selection switch 9 is switched in response to a recording time selection signal which is entered from an input terminal 3.

If the rotational speed of the rotary drum RD is different, the property of the magnetic head is different depending on the frequency of the reproduced signal. Therefore, any one of the equalizers 8a and 8b is selected corresponding to the rotational speed of the rotary drum RD so as to recover the frequency property and the phase property of the reproduced signals sent from the coils A1 and B1.

FIG. 4 shows timing charts of an input signal of the reproduction signal processing unit 10, wherein FIG. 4(1) is a timing chart in a period when the rotational speed of the rotary drum RD is 2,000 r.p.m. and the feeding speed of the magnetic tape 4 is 8.15 mm/sec., for a normal recording and reproducing operation, and FIG. 4(2) is a timing chart in a period when the rotational speed of the rotary drum RD is 1,000 r.p.m., and the feeding speed of the magnetic tape 4 is 4.075 mm/sec., for a long time recording and reproducing operation. In FIG. 4(1), the time $a_1$ represents the time for reproducing the signal recorded on the track $a_1$ sent through the magnetic head A, and also the time $b_1$ represents the time for reproducing the signal recorded on the track $b_1$ through the magnetic head B. In FIG. 4(2), since the feeding speed of the magnetic tape 4 is half the tape feeding speed of the situation shown in FIG. 4(1), it takes twice of the recording or reproducing time of the situation shown in FIG. 4(1) for recording and reproducing the signal through each of the heads in the situation of FIG. 4(2).

The reproduction signal processing unit 10 demodulates the output signals of the equalizer 8a or 8b selected by the equalizer selection switch 9 to the digital signal array so as to obtain digital signals synchronized with the synchronizing bit. After errors in the digital signals are corrected with reference to the parity bit, digital reproduced signals are obtained. The obtained digital reproduced signals are converted to analog signals, whereby the reproduced analog signals are outputted from the output terminal 11.

In the conventional digital magnetic recording device as described above, since the rotation speed of the rotary drum RD is different between the normal recording and reproducing operation and the long time recording and reproducing operation, it is necessary to provide two sets of the reproduction equalizer unit, therefore the size of the magnetic recording and reproducing device has become large.

SUMMARY OF THE INVENTION

An essential object of the present invention is to provide a magnetic tape recording and reproducing device which is able to simplify the circuit arrangement assuring a uniform property of the magnetic head output for both of the normal recording and reproducing operation and the long time recording and reproducing operation.

Another object of the present invention is to provide a magnetic recording and reproducing device which is operable in both of the normal and long time recording-/reproducing operations with one equalizer circuit that equalizes the output signals of the magnetic heads.

In the magnetic recording and reproducing device according to the present invention, there are provided first and second recording and reproducing heads opposing at an angle of 180° each other and a third recording and reproducing adjacent to one of the first and second head on a circumference of a rotary drum, wherein a normal recording and reproducing operation using the first and second recording and reproducing heads and a long time recording and reproducing operation using the third recording and reproducing head and one of the first or second head, which is adjacent to the third head,, are performed at the same rotational speed of the rotary drum but not different tape feeding speeds.

DETAILED DESCRIPTION OF THE PREFERRED EMBODIMENT

An embodiment of a magnetic recording and reproducing device according to the present invention will be explained with reference to FIGS. 5 to 8.

Figure 1:
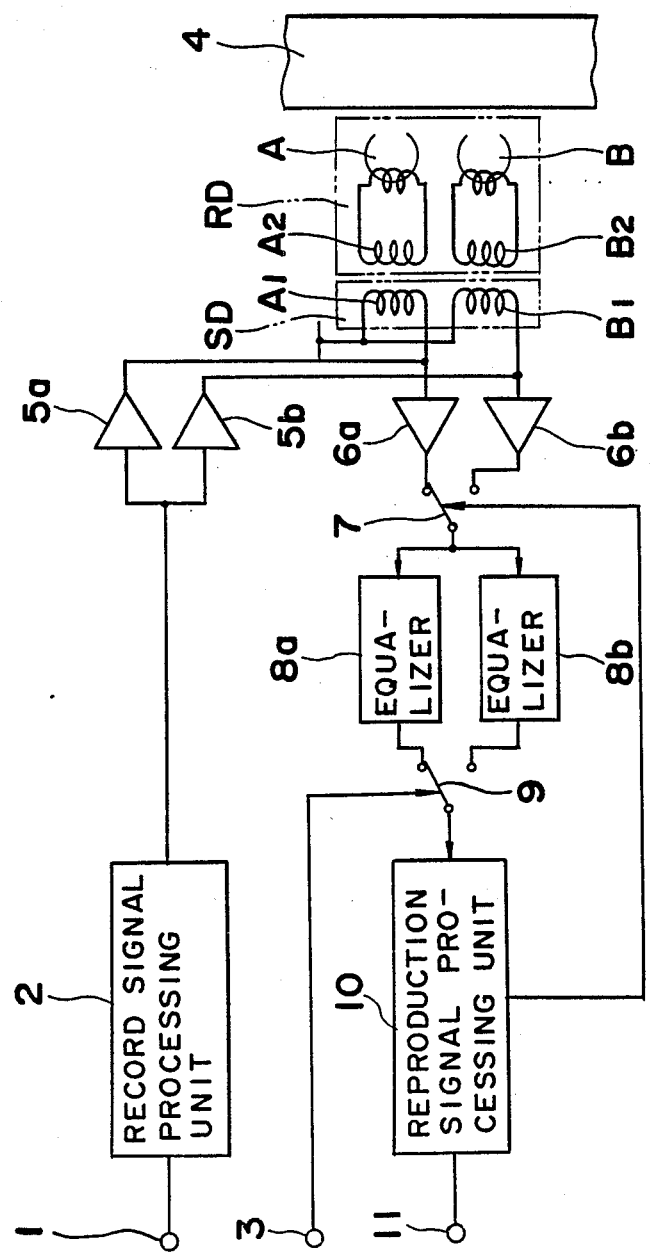
FIG. 1 is a block diagram showing a conventional magnetic recording and reproducing device.
Figure 2:
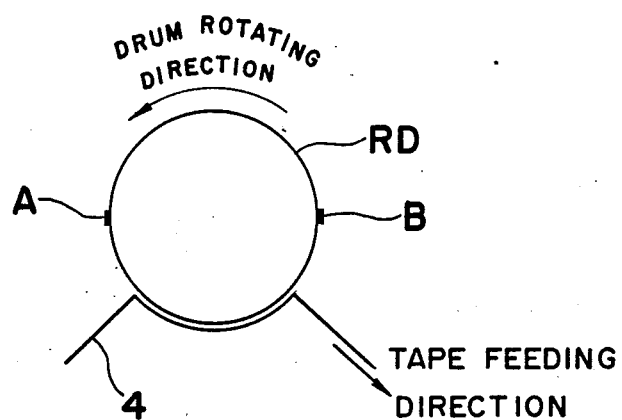
FIG. 2 is a schematic diagram for explaining a position of magnetic heads in FIG. 1.
Figure 3:
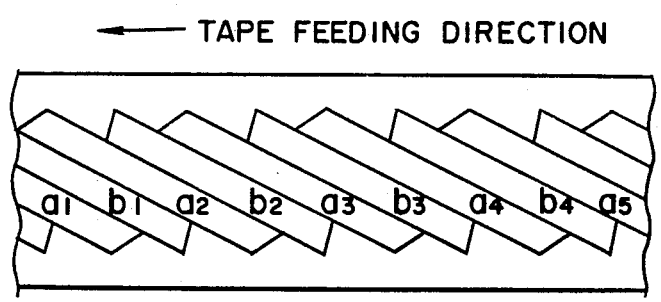
FIG. 3 is a schematic diagram for explaining a track pattern recorded on a magnetic tape in FIG. 1.
Figure 4:
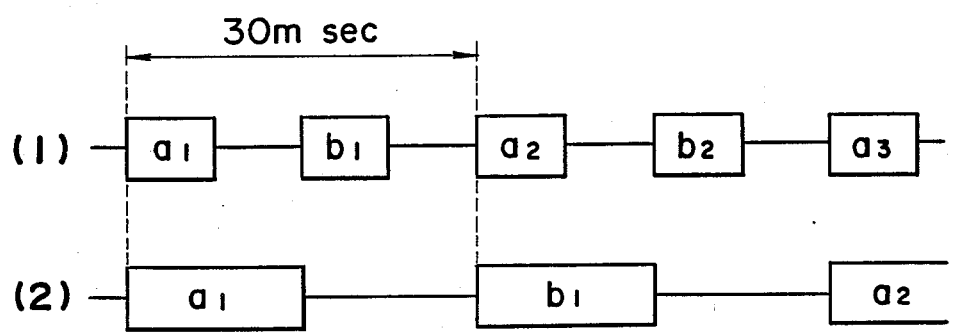
FIG. 4 is a timing chart showing input signals of a reproduction signal processing unit in FIG. 1.
Figure 5:
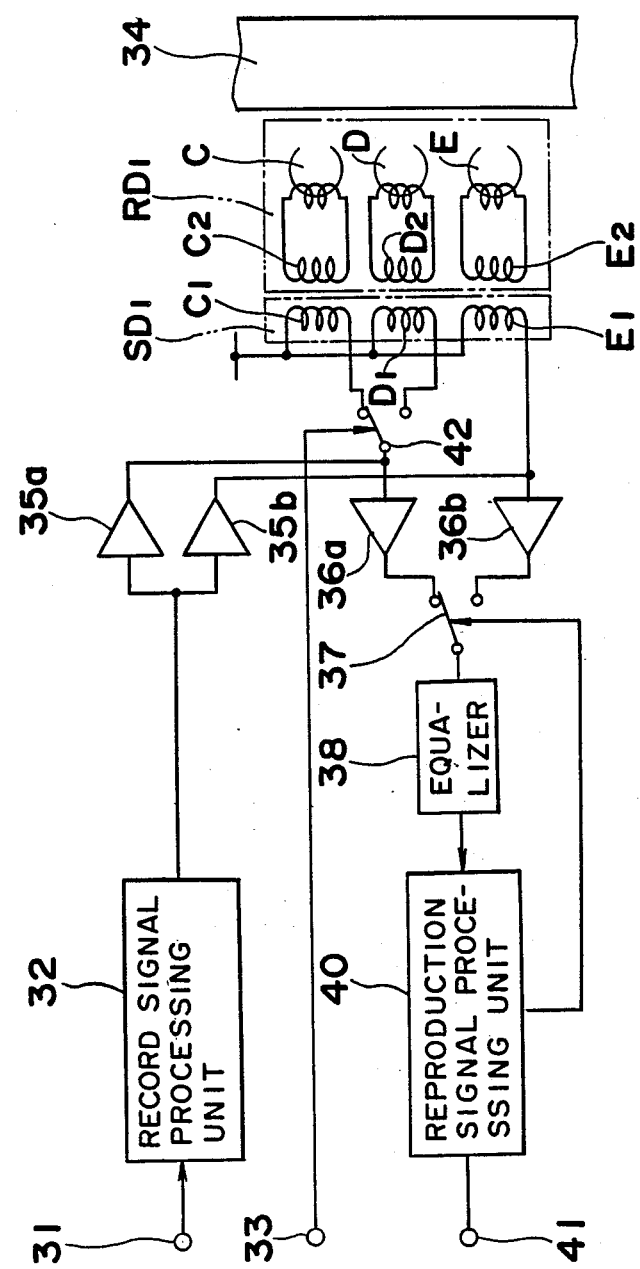
FIG. 5 is a block diagram showing an embodiment of a magnetic recording and reproducing device according to the present invention.

In FIG. 5, analog signals to be recorded entering from an input terminal 31 are applied to a record signal processing unit 32. The analog signals applied to the record signal processing unit 32 are converted into digital form in the record signal processing unit 32. The converted digital recording signals are combined with one or more synchronizing bits and parity bit and converted into an array of digital signals according to a predetermined recording format. The digital signal array, as mentioned above is modulated into high frequency signals having two frequencies appropriate for recording on a magnetic tape 34 with a frequency $f_0$ for the logic "0" bit of the digital signal array and a frequency $f_1$ ($f_1 \neq f_0$) for the logic "1" bit of the digital signal array. Subsequently, the modulated high frequency signals enter amplifiers 35a and 35b.

The modulated signals upon entering the amplifiers 35a and 35b are amplified in terms of current. The output signals of the amplifier 35a are applied to one of the coils C1 and D1 of the transformer of the recording heads in accordance with the selection by a switching operation of a head selection switch 42. This switch is switched switched in response to a recording time selection signal sent from an input terminal 33. The output signals of the amplifier 35b are applied to a coil E1. The coils C1, D1, and E1 which are provided in a fixed drum SD1 are magnetically coupled with the coils C2, D2, and E2, respectively, to constitute a rotary transformer. The frequency modulated output signals of the amplifiers 35a and 35b are induced in the coils C2 or D2 and E2 through the coils C1 or D1 and E1 and are recorded on the magnetic tape 34 through magnetic heads C, D, and E, respectively.

Figure 6:
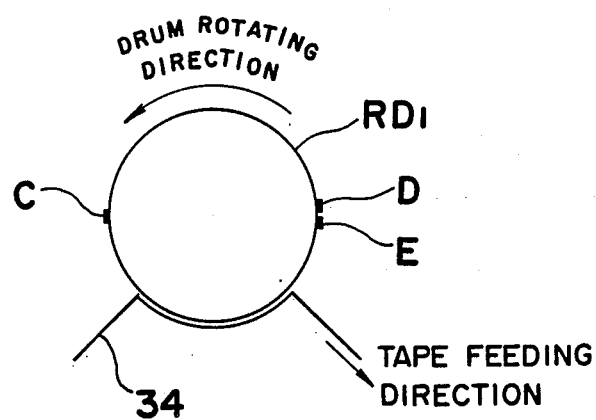
FIG. 6 is a schematic diagram for explaining positions of magnetic heads according to the present invention.

The magnetic heads C, D, and E are provided on the rotary drum RD1 in such a manner that the head gaps face the cylindrical surface of the rotary drum RD1 in a known manner, wherein the heads C and E are disposed at opposite positions at an angle of 180° and the magnetic head D is provided at the position adjacent to the magnetic head E in the circumferential direction of the rotary drum RD1 as shown in FIG. 6. The magnetic heads C and E are attached to the drum RD1 at different azimuth angles to prevent occurrence of noise due to a cross talk. For example, the magnetic head C is attached to the rotary drum RD1 at an azimuth angle of plus 20° and the magnetic head E is attached to the rotary drum RD1 at an opposite azimuth angle of minus 20°. Also, the magnetic head D is attached to the rotary drum RD1 with an azimuth angle of plus 20°, e.g., different from that of the magnetic head E. Above the azimuth angles are defined to reduce noise due to cross talk with an adjacent track. The magnetic head C is selected by switching a head selection switch 42 in the case of the normal recording and reproducing operation and the magnetic head D is selected in the case of the long time recording and reproducing operation. The rotational speed of the rotary drum RD1 is regulated to be constant 2,000 r.p.m. in both the normal recording and reproducing operation and the long time recording and reproducing operation. Only the tape feeding speed of the operations is different. For example, the tape feeding speed in the long time recording and reproducing operation is half the tape speed in the normal recording and reproducing operation.

As shown in FIG. 6, the magnetic tape 34 is wound along the cylindrical surface of the rotary drum RD1 for an angle about 90° and the feeding direction of the magnetic tape 34 is coincident with the rotating direction of the rotary drum RD1.

Figure 7:
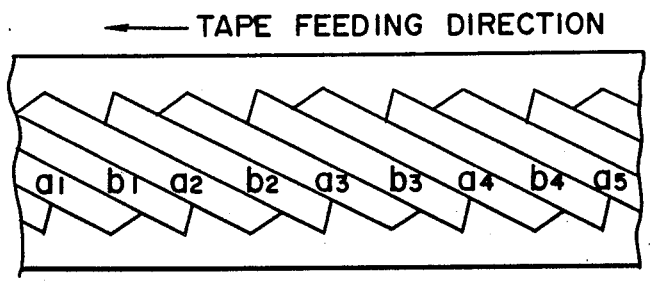
FIG. 7 is a schematic diagram for explaining a track pattern recorded on a magic tape according to the present invention.

FIG. 7 shows a track pattern recorded on the magnetic tape 34 in the situation where the recording and reproducing head C or D is selected by switching the head selection switch 42, wherein tracks $a_1, a_2, ..., a_5, ...$ are the tracks recorded by the magnetic head C or D and tracks $b_1, b_2, ..., b_4, ...$ are the tracks recorded by the magnetic head E. The signals recorded in the track pattern as shown in FIG. 7 are also reproduced through the magnetic heads C or D and E provided on the rotary drum RD1. The signals reproduced through the magnetic heads C or D and E are respectively applied to amplifiers 36a and 36b. The reproduced signals are not continuous signals but intermittent signals generated from the coils C1 or D1 and E1 during the period of tracing the tracks on the magnetic tape 34 with the magnetic heads C or D and E as shown in FIG. 6. Accordingly, the amplifier 36a, or 36b, which is now generating the reproduced signals, is selected by switching the signal selecting switch 37 in response to a switching signal sent from a reproduction signal processing unit 40, so that the output signals of the amplifier 36a or 36b are applied to an equalizer 38.

The equalizer 38 is provided to compensate the frequency property and phase property of the magnetic head and the output signals of the equalizer 38 ar applied to the reproduction signal processing unit 40. Since the rotational speed of the rotary drum RD1 is the same in both the normal recording and reproducing operation through the magnetic heads C and E and the long time recording and reproducing operation through the magnetic heads D and E, the frequency property and the phase property of the magnetic heads can be compensated by providing only one equalizer 38.

Figure 8:
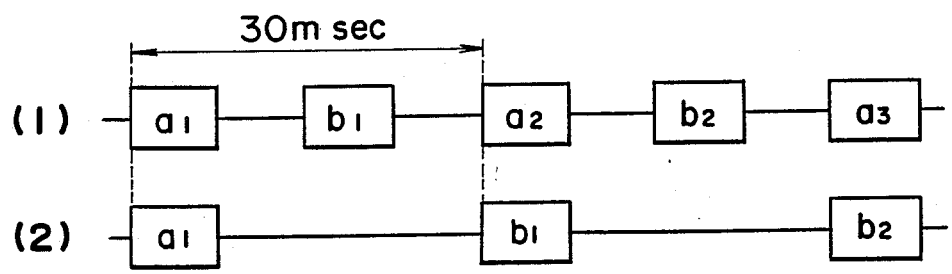
FIG. 8 is a timing chart showing input signals of a reproduction signal processing unit according to the present invention.

FIG. 8 shows a timing chart of input signals of the reproduction signal processing unit 40. FIG. 8(1) is a timing chart for the time of normal recording and reproducing operation, and FIG. 8(2) is a timing chart for the time of long time recording and reproducing operation. In FIG. 8(1), the time $a_1$ represents the time period for reproducing the signal from the magnetic head C and also the time $b_1$ represents the time for reproducing the signal from the magnetic head E. In FIG. 8(2), the time $a_1$ represents the time for reproducing the signal from the magnetic head D and the time $b_1$ represents the time for reproducing the signal from the magnetic head E. Since the magnetic heads D and E are provided in the adjacent positions on the rotary drum RD1, the magnetic head can be switched every other rotation of the rotary drum RD1.

The reproduction signal processing unit 40 demodulates from the output signals of the equalizer 38 to produce the digital signal array so as to obtain digital signals on the basis of the synchronizing bit. With respect to the obtained digital signals, errors in the digital signals are corrected with reference to the parity bit so as to obtain digital reproduction signals. The obtained digital reproduction signals are converted into analog form, whereby reproduction analog signals are outputted from the output terminal 41.

In the present embodiment, when the normal time recording/reproducing operation is set, the magnetic heads C and E are used with 2,000 r.p.m. of the rotation speed of the rotary head RD1. On the other hand, when the long time recording/reproducing operation is set, the magnetic heads D and E are used with the same rotation speed 2,000 r.p.m. of the rotary head RD1. By changing the magnetic heads being used for the normal recording/reproducing operation and long time recording/reproducing operation, it becomes possible to use the same rotation speed for the rotary head RD1 for both the normal recording/reproducing operation and the long time recording/reproducing operation.

Thus, in the magnetic recording and reproducing device as described above, only one equalizer is used in common for both the normal recording and reproducing operation and the long time recording and reproducing operation, thereby reducing the number of the circuit elements needed and simplifying the production process.

As described above, according to the present invention, there is provided a third magnetic head on the rotary drum, whereby the recording and reproducing operations can be performed at the same rotation speed of the rotary drum for both the normal recording and reproducing operation and long time recording and reproducing operation; therefore, the rotation speed of the rotary drum can be easily adjusted. Moreover, the reproduced signals can be equalized in only one equalizer circuit for both the normal reproducing operation and the long time reproducing operation, therefore, the construction of the magnetic recording and reproducing device can be simplified.

The above example is a preferred embodiment of the present invention to illustrate the concepts of the present invention. This description is illustrative and should not limit the scope of the present, but the scope should be commensurate to the scope of the attached claims.

What is claimed is:

1. A rotatable head type digital magnetic recording and reproducing device for recording and reproducing signals, comprising;
    a rotary drum;
    a first recording and reproducing head having an azimuth angle provided on said rotary drum;
    a second recording and reproducing head having an azimuth angle different from that of said first head and provided at a position opposite to said first head on said rotary drum in terms of a circumferential direction thereof;
    a third recording and reproducing head, adjacent to said second head, having an azimuth angle different from that of said second head;
    selecting means, operatively connected to said first and third heads, for selecting an operation mode from a plurality of operation modes, said plurality of operation modes including at least a normal recording and reproducing mode using said first and second heads and a long time recording and reproducing mode using said third head and second head, said operation modes being performed at a same rotational speed of said rotary drum, but being performed at different tape speeds; and
    a sole equalizer to equalize all the signals produced by said operation modes.

2. The rotatable head tape digital magnetic recording and reproducing device as claimed in claim 1, wherein a tape feeding speed in said long time recording and reproducing operation mode is half a tape feeding speed in said normal recording and reproducing operation mode.

3. The rotatable head type digital magnetic recording and reproducing device as claimed in claim 1, wherein said first and second heads reproduce from and record upon different tracks during said normal recording and reproducing mode, and said third and second heads reproduce from and record upon different tracks during said long time recording and reproducing mode.

* * * * *